(12) United States Patent
Noh

(10) Patent No.: US 7,370,722 B2
(45) Date of Patent: May 13, 2008

(54) STRUCTURE FOR PROTECTING BRAKE PEDAL FROM IMPACT

(75) Inventor: Ji-youn Noh, Suwon-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 377 days.

(21) Appl. No.: 11/117,396

(22) Filed: Apr. 29, 2005

(65) Prior Publication Data

US 2005/0275204 A1    Dec. 15, 2005

(30) Foreign Application Priority Data

Jun. 11, 2004   (KR) .................. 10-2004-0043184

(51) Int. Cl.
*G05G 1/14*    (2006.01)
(52) U.S. Cl. ................. 180/274; 280/748; 296/187.05; 74/512
(58) Field of Classification Search .............. 74/512, 74/560; 180/271, 274; 296/187.05; 280/748, 280/750
See application file for complete search history.

(56) References Cited

U.S. PATENT DOCUMENTS 6,101,894 A * 8/2000 Tiemann et al. ............... 74/512

2002/0179359 A1* 12/2002 Kawai et al. ............... 180/274

FOREIGN PATENT DOCUMENTS

| EP | 1 106 458 A2 * | 6/2001 |
| JP | 11-198776 | 7/1999 |
| KR | 10-2004-0031239 | 4/2004 |

OTHER PUBLICATIONS

English Language Abstract of JP 11-198776.
English Language Abstract of KR 10-2004-0031239.

* cited by examiner

*Primary Examiner*—Ruth Ilan
(74) *Attorney, Agent, or Firm*—Greenblum & Bernstein, P.L.C.

(57) ABSTRACT

A structure for protecting a brake pedal of a vehicle from impact, the vehicle having a cowl crossbar provided with a pair of spaced apart connection holes, includes a supporter provided with a pair of converged brackets, each of the converged brackets provided with connection holes couplable with the connection holes of the cowl crossbar by using bolts, and a plurality of supporting protrusions provided on an end of the supporter, the supporting protrusions preventing the brake pedal from moving toward an occupant of the vehicle in the event of a collision.

1 Claim, 3 Drawing Sheets

STRUCTURE FOR PROTECTING BRAKE PEDAL FROM IMPACT

RELATED APPLICATIONS

The present disclosure relates to subject matter contained in Korean Application No. 10-2004-43184, filed on Jun. 11, 2004, which is herein expressly incorporated by reference its entirety.

BACKGROUND OF THE INVENTION

1. Field of the Invention

The present invention relates to a structure, for protecting a brake pedal from impact, comprising a supporter installed on a cowl crossbar installed on a vehicle frame in a transverse direction for supporting an instrument panel, in which the supporter is located at a position adjacent to a brake pedal arm so that the supporter prevents the brake pedal from being pushed toward a driver's seat when a traffic accident occurs, thereby protecting a driver from injury.

2. Description of the Related Art

Generally, brake systems serve to decelerate or stop a vehicle in motion, and simultaneously to maintain a parking state of the vehicle.

Of the brake systems, a foot brake, which is manipulated by a driver's foot in motion, employs a hydraulic mechanism. Hereinafter, a hydraulic braking system will be described in detail.

First, when a, driver's foot operates a brake pedal, a piston installed in a master cylinder moves forward by a push rod connected to a pedal arm, and compresses fluid placed in the cylinder.

The compressed fluid compresses brake fluid through a brake line, and the compressed brake fluid in a high-pressure state is supplied to a wheel cylinder, thereby allowing a lining or a pad to be compressed by a brake drum or a disk. Thus, a braking operation is achieved.

Then, when the, driver's foot releases the brake pedal, the brake fluid, having been compressed, is returned to the master cylinder, thus allowing the braking operation to be stopped.

FIG. 1 is a schematic view illustrating installation of a conventional brake pedal. The brake pedal 11 is installed on a dash panel 12 formed on a lower part of a vehicle frame.

When an accident of a vehicle happens, the dash panel 12, having a weak strength, is protruded toward a driver's seat, and thus the brake pedal 11 moves toward the driver's seat.

The brake pedal 11, having moved toward the driver's seat, may easily hits a driver's ankle or shin, thereby inflicting injury upon the driver.

In order to solve the above problem, there is proposed a method for increasing the stiffness of the dash panel 12. However, the increase of the thickness of the dash panel 12 necessary to mitigate the aforementioned problem increases the weight of the vehicle, thereby depreciating the rate of fuel consumption.

SUMMARY OF THE INVENTION

Therefore, the present invention has been made in view of the above problems, and it is an object of the present invention to provide a structure, for protecting a brake pedal from impact, comprising a supporter installed on a cowl crossbar positioned adjacent to the brake pedal, in which the supporter supports a brake pedal arm from moving toward a driver's seat when a traffic accident occurs, thereby protecting a driver from injury caused by the brake pedal.

In accordance with the present invention, the above and other objects can be accomplished by the provision of a structure for protecting a brake pedal from impact, comprising: a cowl crossbar, for a vehicle, provided with a pair of connection holes separated from each other, a supporter provided with a pair of converged brackets provided with connection holes coupled with the connection holes of the cowl cross bar using bolts; and supporting protrusions, formed on an end of the supporter, for preventing the brake pedal from moving.

The structure for protecting the brake pedal from impact comprises the supporter, including the supporting protrusions, installed on the cowl crossbar, so that the brake pedal is supported by the supporter and is thus impeded from moving toward a driver's seat when a vehicle accident occurs, thereby protecting a driver from injury—caused by from the movement of the brake pedal.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

Figure 1:
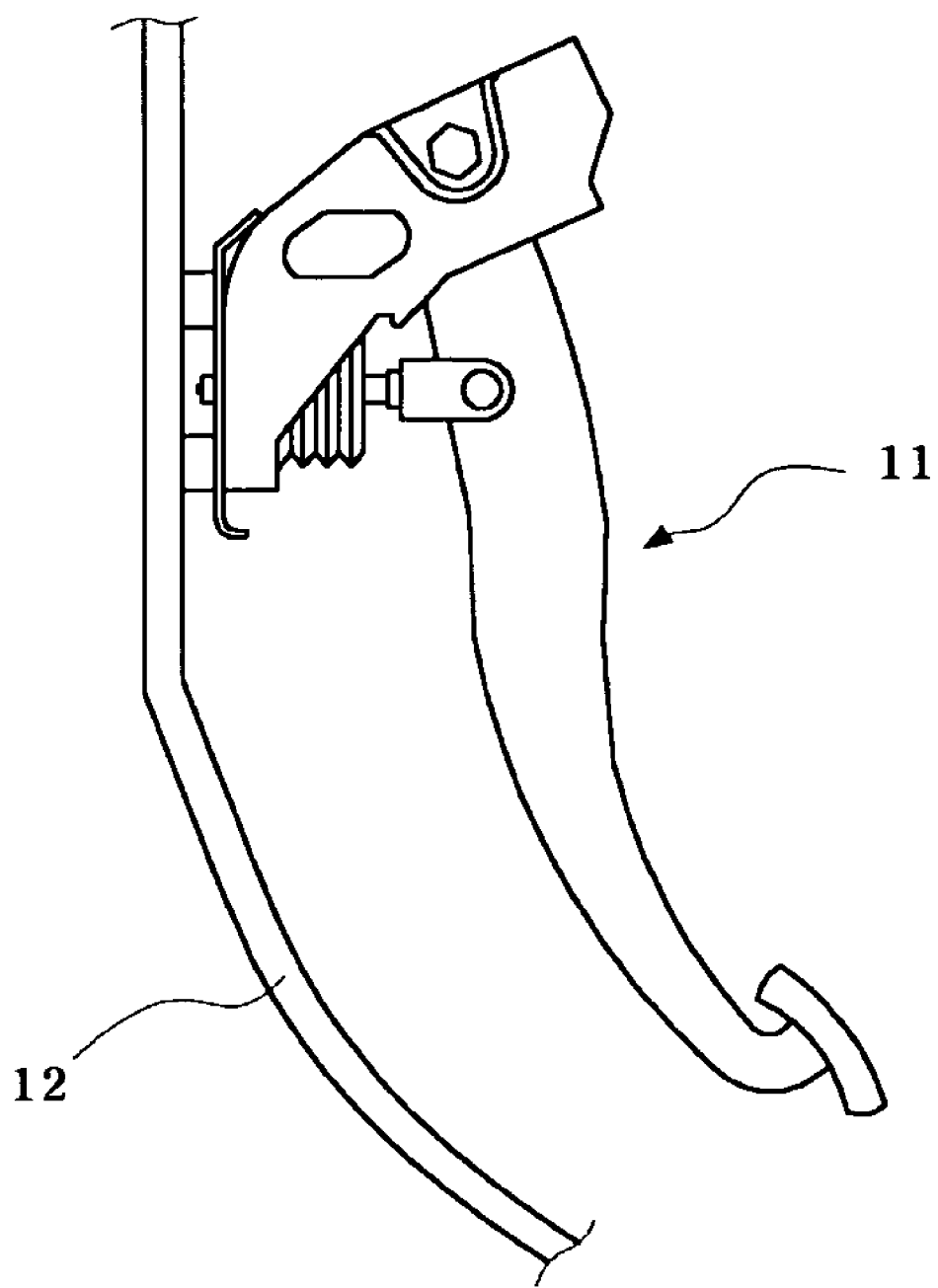
FIG. 1 is a schematic view illustrating installation of a conventional brake pedal.

Now, a preferred embodiment of the present invention will be described in detail with reference to the annexed drawings.

The following description made in conjunction with the preferred embodiment of the present invention has been made only for a better understanding of the present invention. Some parts in this embodiment are substantially the same as those in the prior art and are thus denoted by the same reference numerals even though they are depicted in different drawings.

Figure 2:
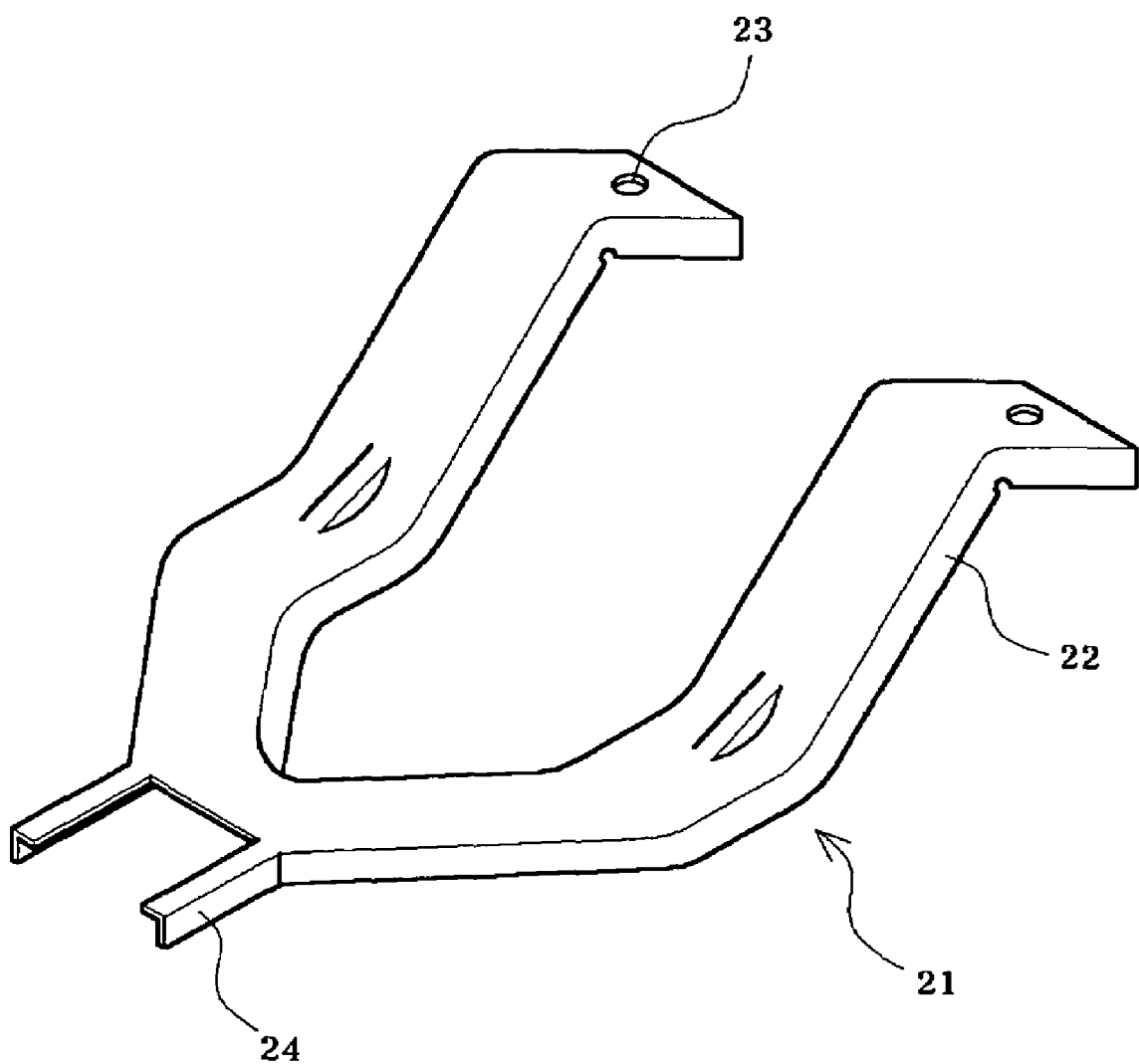
FIG. 2 is a schematic view illustrating a supporter in accordance with the present invention.
Figure 3:
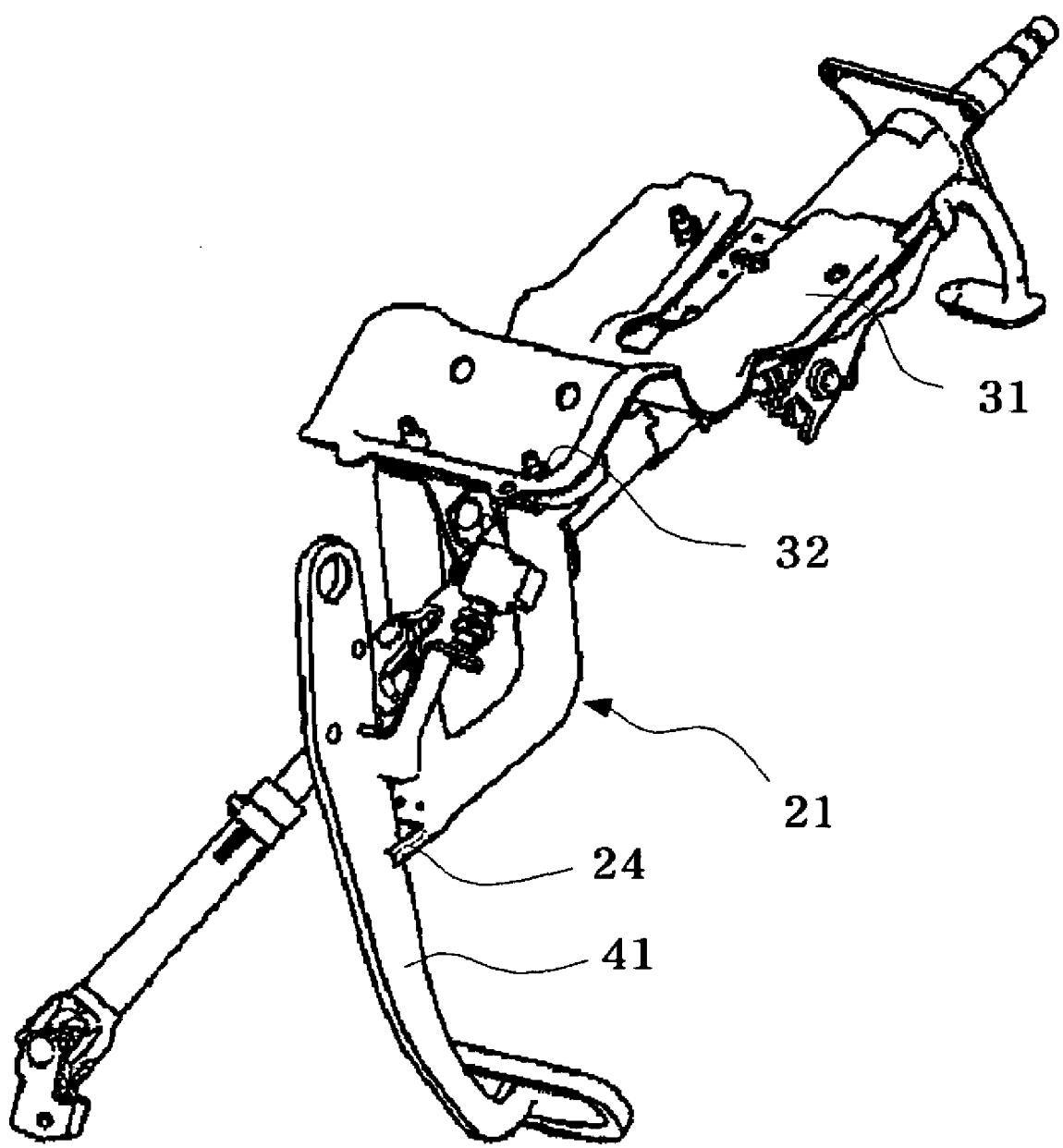
FIG. 3 is a schematic view illustrating installation of the supporter of FIG. 2 on a cowl crossbar.

FIG. 2 is a schematic view illustrating a supporter in accordance with the present invention, and FIG. 3 is a schematic view illustrating installation of the supporter of FIG. 2 on a crossbar.

As shown in FIGS. 2 and 3, a supporter 21 is installed on one end of a cowl crossbar 31 installed in a vehicle in a transverse direction.

The supporter 21 has a structure such that a pair of brackets 22 separated from each other are converged at their ends, and a connection hole 23 is formed through each of the brackets 22.

Supporting protrusions 24 are formed on ends of the converged portions of the brackets 22.

Preferably, the brackets 22 and the supporting protrusions 24 of the supporter 21 are integrally formed so as to increase the strength of the supporter 21.

A pair of connection holes 32 are formed through the steering column mounting bracket 31 bonded to the supporter 21.

Hereinafter, function and effects of the above-described structure for protecting the brake pedal from impact will be described in detail.

First, the connection holes 23 of the brackets 22 coincide with a pair of the connection holes 32 of the steering column mounting bracket 31, and the brackets 22 are fixed to the cowl cross bar 31 by inserting bolts respectively to the connection holes 23 and 32.

Here, one end of the supporter 21 is fixed to the steering column mounting bracket 31, and the other end of the supporter 21 is positioned adjacent to a brake pedal arm 41.

That is, the brake pedal is installed on a dash panel (not shown) of a vehicle, and the end of the supporter 21 is positioned adjacent to the brake pedal arm 41.

When the front part of the vehicle collides with an object under the above-described installation state, impact is applied to the dash panel, thereby causing the brake pedal to be pushed toward a driver's seat and thus causing the brake pedal arm 41 to move toward the driver's seat.

The supporter 21 positioned adjacent to the brake pedal arm 41 prevents the brake pedal arm 41 from being pushed toward the driver's seat.

Accordingly, even when the brake pedal arm 41 is pushed toward the driver's seat due to a vehicular accident, the brake pedal arm 41 is supported by the supporter 21, and thus no longer moves toward the driver's seat. The impact, having been transmitted to the supporter 21, is divided into two portions and the two divided portions of the impact are respectively transmitted to the brackets 22 and then transmitted to the cowl crossbar, thus dispersing the force of the impact.

Thereby, the above structure of the present invention prevents a driver from being be injured by the brake pedal when a vehicle accident occurs.

In a vehicle accident, the brake pedal arm 41, having contacted the supporter 21, may move left or right, thereby injuring the driver. Here, the brake pedal arm 41 is accepted at one end of the supporter 21 by the supporting protrusions 24, which are formed on ends of the brackets 22 of the supporter 21, thereby preventing the driver from being injured.

As apparent from the above description, the present invention provides a structure for protecting a brake pedal from impact, in which a supporter installed on a cowl crossbar is positioned in a line with a brake pedal arm and supports the brake pedal arm so that the brake pedal is not pushed toward a driver's seat when a vehicle accident occurs, thereby protecting a driver from injury—caused by from the pushed brake pedal.

Further, the supporter of the structure of the present invention is divided into two portions and bonded to the cowl crossbar, thereby efficiently absorbing impact applied to the brake pedal arm when a vehicle accident occurs.

Although the preferred embodiment of the present invention has been disclosed for illustrative purposes, those skilled in the art will appreciate that various modifications, additions and substitutions are possible, without departing from the scope and spirit of the invention as disclosed in the accompanying claims.

What is claimed is:

1. A structure for protecting an occupant from impact with a brake pedal of a vehicle, the vehicle having a steering column mounting bracket provided with a pair of spaced apart connection holes, the structure comprising:
   a supporter provided with a pair of converged brackets, each of the converged brackets provided with a connection hole couplable with a respective one of the connection holes of the steering column mounting bracket by bolts, such that the supporter is fixed to the steering column mounting bracket at an end thereof, and wherein the supporter extends downwardly and is angled toward the brake pedal; and
   a plurality of supporting protrusions provided on an end of the supporter, the supporting protrusions positioned on opposite sides of the brake pedal arm such that the supporting protrusions preventing the brake pedal from moving toward the occupant of the vehicle in the event of a collision.

* * * * *